United States Patent Office 3,403,886
Patented Oct. 1, 1968

3,403,886
ROTARY VALVE WITH POSITIVE REDUCTION CLOSURE MEMBER
Alfred Walter Barker, Sherington, England, assignor to The Sandall Precision Company Limited, Bletchley, England, a corporation of Great Britain
Filed Dec. 27, 1965, Ser. No. 516,412
4 Claims. (Cl. 251—163)

ABSTRACT OF THE DISCLOSURE

A valve chamber having opposed ports and containing a rotatable valve body provided with a passage which communicates the ports in the valve-open position. A closure member is mounted on the valve body for radially inwardly and outward movement, and is in register with one of the ports in the valve-closed position. A driving member rotated by an actuating shaft is in the valve chamber and has a lost-motion driving connection to the valve body. Cam means react between the driving member and the closure member to move the latter outwardly into sealing engagement with the port, as a function of rotation of the driving member while the lost-motion connection permits the valve body to remain stationary.

---

Figure 1:
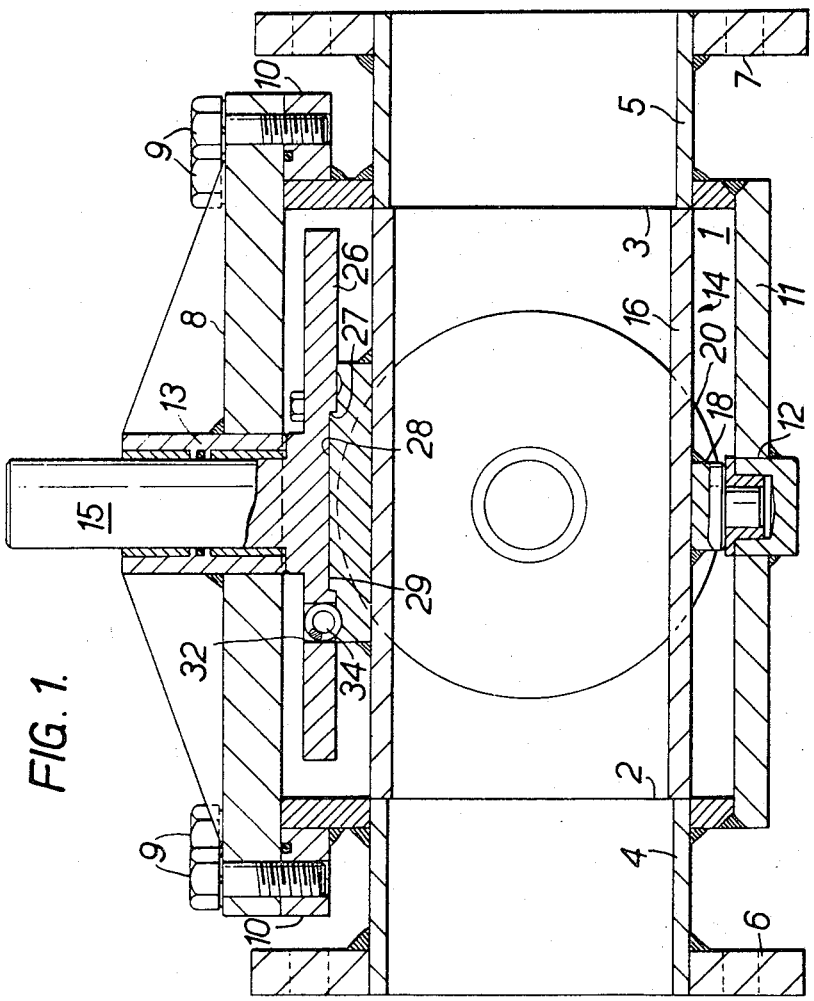

This invention concerns fluid control valves and is more particularly concerned with valves intended to be incorporated in large-size pipelines conveying fluids such as crude oil, petroleum products and water. The invention is not, however, limited to such applications.

The invention is concerned with valves of the through-flow type comprising a valve chamber having ports in the walls thereof and adapted for communication with fluid conduits, and a valve body rotatable within said valve chamber between valve-open and valve-closed positions, the valve body incorporating an unobstructed passage which, in the valve-open position, registers with the said ports and thereby places these in intercommunication. In valves of relatively small sizes the valve body usually takes the form of a plug, spherical, cylindrical or conical, with a diametral passage, whilst in larger sizes the weight of the valve body is reduced by elimination of material that plays no functional part, the valve body in such case being constituted, essentially, by a tube defining the said passage and a lateral lug that serves to register with one of the ports, in the valve-closed position of the valve body, so as to plug said port and thereby prevent the flow of fluid around the valve body between that port and the other port.

In all valves of this general type there arises the problem of effectively sealing at least one of the valve chamber ports when the valve body is in the valve-closed position, thereby positively to interrupt communication between the ports and the fluid conduits connected thereto. Typical arrangements for this purpose adopted in valves of small sizes and having a valve body constituted by a body of revolution consists in the provision of resilient sealing rings or the like surrounding one or both ports in the valve chamber to bear against the surface of the valve body when this is in its valve-closed position; such sealing rings or the like are, of course, subject to wear during rotation of the valve body.

In larger sizes of such valves a typical arrangement consists in providing a resilient seal on the valve body lug, or surrounding one of the valve chamber ports, the valve body being arranged to be movable towards and away from such port so that fluid pressure within the valve chamber tends to move the valve body so as to hold the lug on the valve body in sealing-tight engagement with said port. This arrangement has two principal disadvantages: the sealing arrangement is only effective if the lug on the valve body is adapted to close the fluid outlet port of the valve chamber, and sealing effectiveness is dependent upon fluid pressure in the valve chamber and leakages will occur when such pressure is low.

An object of the present invention is to provide a valve of the aforesaid type in which the aforesaid disadvantages of known and proposed arrangements for sealing at least one port of the valve chamber in the valve-closed position of the valve body are eliminated or at least substantially reduced.

A valve in accordance with the present invention comprises a valve chamber having opposed ports adapted for connection to fluid conduits; a valve body in said valve chamber and adapted for rotation between valve-open and valve-closed positions, said valve body including a passage adapted to register with said ports in the valve-open position of said valve body; a closure member carried by said valve body and positioned to register with one of said ports in the valve-closed position of the valve body, said closure member being movable, relatively to the valve body, along a radius to the axis of rotation of the valve body; drive means for rotating the valve body between the said valve-open and valve-closed positions, said drive means including a lost-motion connection to said valve body; and cam means responsive to relative rotation between the drive means and the valve body, in this valve-closed position of the latter, for moving said closure member relatively to the valve body into and out of sealing engagement with said one port in the valve chamber.

In some embodiments of the invention, the valve body carries two closure members positioned to register with both ports of the valve chamber when the valve body is in the valve-closed position, each closure member being movable along a radius to the axis of valve body rotation and co-operating with cam means responsive to relative rotation between the drive means and the valve body for moving the closure members into and out of sealing engagement with the valve chamber ports.

Desirably the arrangement of the closure member and the lost-motion connection between the valve body and the drive means incorporates resilient biassing acting to oppose movement of the closure member outwardly of the axis of rotation of the valve member. In conjunction with stop means limiting rotation of the valve body, such arrangement ensures that radial movement of the closure member relatively to the valve body occurs only when the valve body is at rest in the valve-closed position, whereby wear of the sealing surfaces of the closure member and valve chamber is avoided or minimised. Thus conveniently the lost-motion connection between the drive means and the valve body is spring-biased in the sense to cause relative rotation effective to move the closure member towards the axis of rotation of the valve body.

Figure 2:
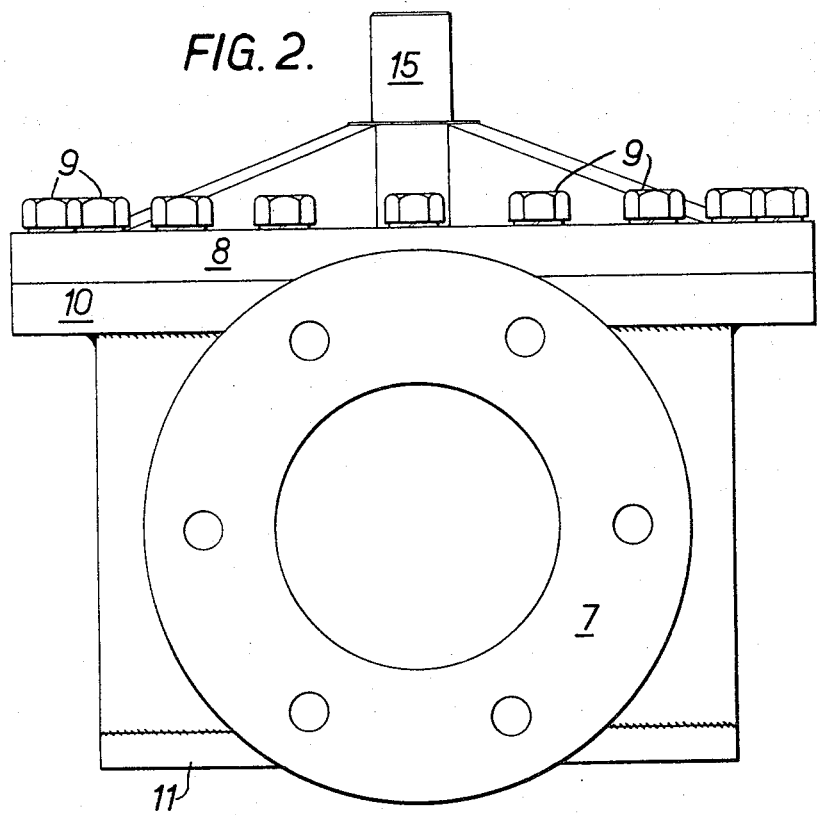
Figure 3:
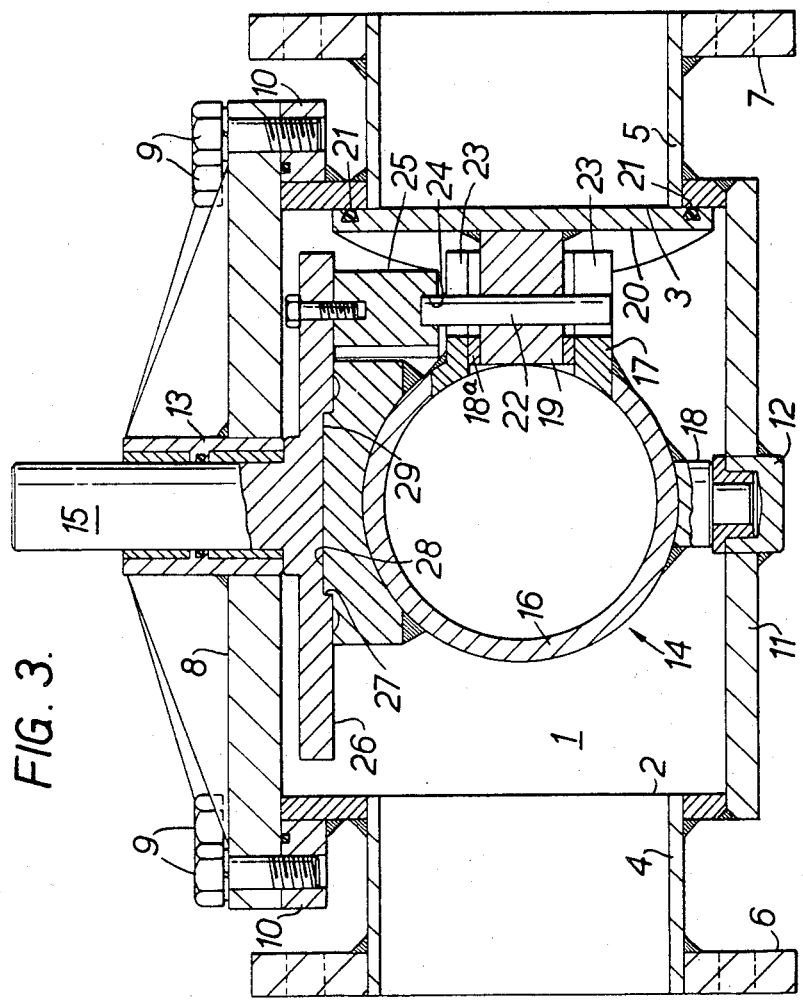
Figure 4:
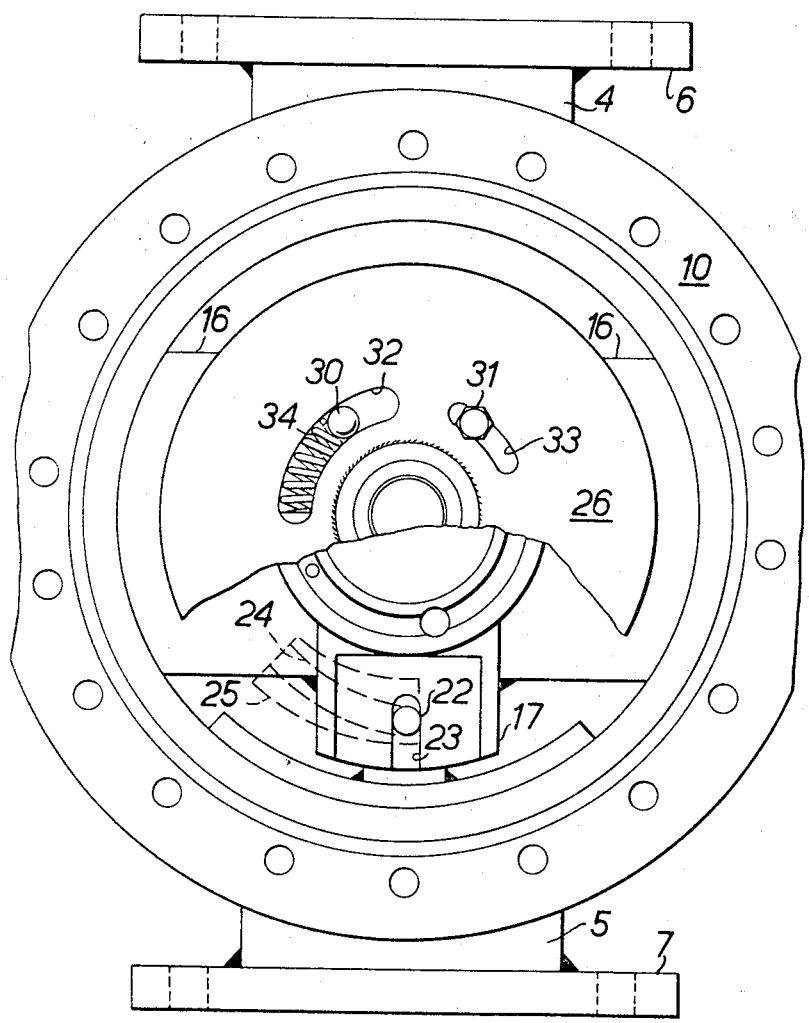
Figure 5:
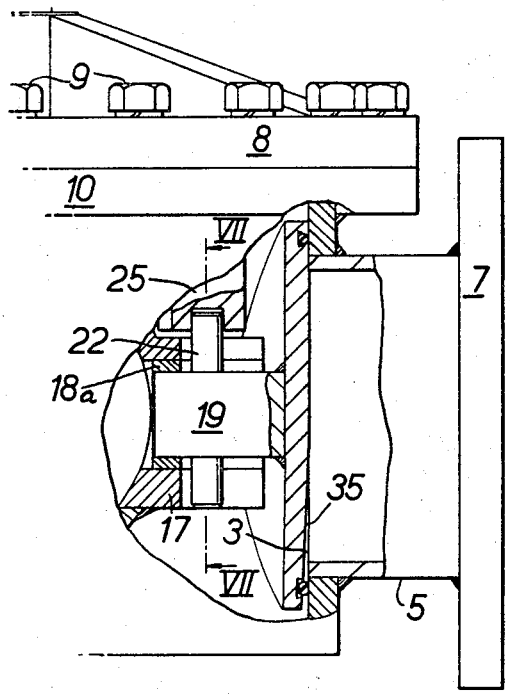
Figure 6:
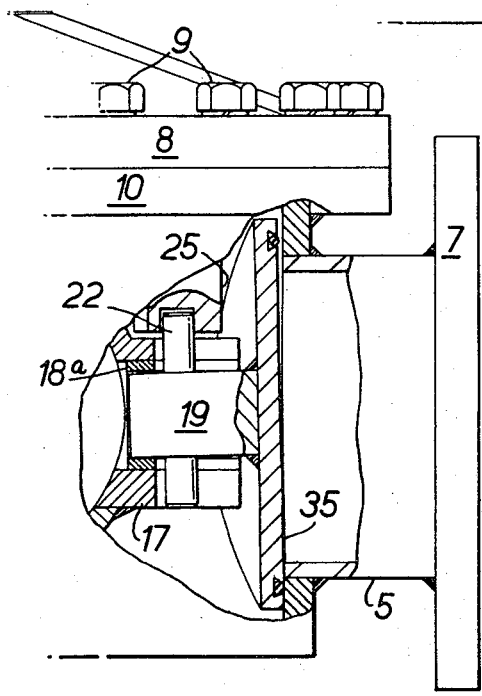
Figure 7:
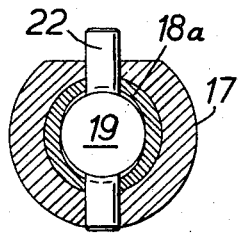

The invention will be more clearly understood by reference to the following description taken in conjunction with the accompanying drawings, in which:

FIGURE 1 is a sectional view of an embodiment of the invention in its valve open position;
FIGURE 2 is an end view of the valve of FIGURE 1;
FIGURE 3 is a sectional view of the valve of FIGURE 1, but in its valve-closed position;
FIGURE 4 is a plan view of the valve of FIGURE 1 in its valve-closed position, but with parts removed for clarity;
FIGURES 5 and 6 are fragmentary side views, partially in section, of a modified valve; and
FIGURE 7 is a section on line VII—VII of FIGURE 5.

Referring to FIGURES 1 to 4, a valve in accordance with the invention comprises a housing defining a valve chamber 1 in the shape of an upright cylinder having diametrically opposite ports 2 and 3 communicating with pipe stubs 4 and 5 for connection via flanges 6 and 7 to fluid pipe lines, the chamber being closed at its upper end by a cover 8 bolted at 9 to a peripheral flange 10 on the chamber.

The bottom 11 of the chamber and its cover 8 mount aligned bearings 12 and 13 for, respectively a valve body 14 and a drive shaft 15 that extends through the cover.

The valve body 14 comprises a horizontally disposed tube 16 with a lateral lug 17 and a dependent trunnion 18 for engaging the bearing 12 in the bottom of the chamber, whereby the tube may be rotated within the chamber and about the vertical axis of the latter, through 90°, between a valve-open position as shown in FIGURE 1 in which the tube bridges the ports 2 and 3 and a valve-closed position as shown in FIGURES 3 and 4 in which the lug 17 faces the port 3.

The lug is tubular and fitted with a bearing 18a for a spigot 19 on a closure member 20 in the form of a disc the front face of which is a portion of a cylindrical surface congruent with the internal surface of the valve chamber in the vicinity of the port 3 and is fitted with a sealing O-ring 21 adapted to mate with a sealing surface surrounding the port 3. The closure member 20 is thus movable radially of the valve body axis of rotation, outwards movement of the closure member in the valve-closed position of the valve body 14 effecting sealing-tight closure of the port 3.

The spigot 19 of the closure member 20 is transfixed by a vertical pin 22 extending through slots 23 in the lug 17 and into engagement with a cam groove 24 in a portion 25 mounted under a drive disc 26 overlies the valve body 14 and is rotatable thereon, the body 14 and drive disc 26 being retained in coaxial relation by interfitting at 27 of a central boss 28 on the body and a corresponding recess 29 on the underside of the disc.

The drive disc 26 is secured to the lower end of the drive shaft 15 so as to rotate therewith.

The valve body 14 has a lost-motion connection to the drive disc 26 constituted by a pin 30 extending from the upper face of the body and extending through an arcuate slot 32 in the disc. A bolt, extending through another arcuate slot 33 in the disc, prevents separation of the body and disc but permits relative rotation therebetween to the extent permitted by the arcuate slot 32 in the disc and a helical spring 34 which is seated in the arcuate slot 32. This spring 34 acts against the pin 30 and biasses the body 14, rotationally, relatively to the drive disc 26 in the sense to cause the cam groove 24 to move the pin 22 radially inwardly of the valve chamber.

Stops (not shown) on the valve chamber 1 and on the valve body 14 limit the rotation of the letter to the 90° required for its movement between the valve-open and valve-closed positions thereof.

Except when the valve has been closed as described below, the closure member 20 is held retracted inwardly of the valve body. Upon rotation of the drive shaft 15 in the sense to move the valve body 14 to its valve-closed position, the spring 34 transmits drive shaft motion to the valve body 14 without lost-motion until the valve body has reached its stop-limited valve-closed position, when continued rotation of the drive shaft 15 rotates the drive disc 26 relatively to the valve body, compressing the spring 34 and, through the cam groove 24 and pin 22, urging the closure member 20 into sealing engagement with the sealing surface around the port 3.

Upon rotation of the drive shaft 15 in the opposite direction, lost-motion occurs between the drive disc 26 and valve body 14 until pin 30 reaches the end of the arcuate slot 32 in the drive disc, the relative movement between the disc and body effecting retraction of the closure member 20 from the sealing surface; further rotation of the drive shaft 15 then effects rotation of the valve body 14 to its valve-open position.

In a modification of the embodiment described with reference to FIGURES 1 to 4 the closure member 20 has a shallow chamfer 35 in a lower segment of its front face as shown in FIGURES 5 and 6. Furthermore as shown in FIGURE 7 the bearing 18a is designed so that the spigot 19 can swing in a vertical plane. This arrangement facilitates opening of the closure member 20 since it permits the upper regions of the closure member 20 to be tilted back as shown in FIGURE 6 sufficient to break engagement between the upper regions of the O-ring 21 and the sealing surface around the port 3 and allow fluid to pass through the gap. This reduces considerably the pressure differential acting on the back and front of the closure member 20 so that less effort is required to retract bodily the closure member from the port 3.

Valves in accordance with the invention may be constructed in all sizes including, for instance, sizes suitable for pipe lines of very large diameter.

Valves in accordance with the invention may be equipped, as indicated hereinbefore, with closure members for sealing both parts of the valve chamber in the valve-closed position of the valve body. Thus, for example, the above described embodiment may be modified by the provision of a pair of diametrically opposed lateral lugs on the valve body tube, each mounting the spigot of a closure member in the manner described, the cam means being duplicated to provide for simultaneous movement of the two closure members of the valve body, when in its valve-closed position, in response to relative rotation between the drive disc and the valve body.

A valve having two closure members may conveniently also be equipped with a valve chamber drain plug or cock, the removal or opening of which, when the valve is closed, draining the valve chamber and demonstrating the effectiveness of the closure member seals by the absence of a flow of fluid from the chamber following draining thereof.

I claim:

1. A valve comprising in combination, a housing defining a valve chamber having opposed ports for connection to fluid conduits, a valve body rotatable in said chamber between valve-open and valve-closed positions and having a passage communicating said ports in the valve-open position, at least one closure member carried by said valve body and registrable with one of said ports in the valve-closed position, means mounting said closure member on the valve body for inward and outward radial movement with respect to the axis of rotation of said body, an actuating shaft rotatably journalled in said housing coaxially with said valve body, a drive member secured to and rotatable with said shaft in said chamber, a lost-motion drive connection between said drive member and said valve body, and cam means reacting between said drive member and said closure member in response to rotation of the drive member while said lost-motion drive connection permits said valve body to remain stationary in its valve-closed position, said cam means being operative to move said closure member radially outwardly and inwardly into and out of its sealing engagement with said one of said ports.

2. The device as defined in claim 1 wherein said lost-motion drive connection embodies resilient means biasing said closure member radially inwardly.

3. The device as defined in claim 1 wherein said closure member mounting means include means for permitting tilting of the closure member in a plane parallel to the axis of rotation of said valve body.

4. The device as defined in claim 1 wherein said closure member mounting means include means for permitting tilting of the closure member in a plane parallel to the axis of rotation of said valve body, said cam means also being operative to tilt the closure member in said plane away from said port during an initial stage of radially inward movement of the closure member.

(References on following page)

References Cited

UNITED STATES PATENTS

| | | | |
|---|---|---|---|
| 1,595,038 | 8/1926 | Vencl | 251—158 |
| 1,985,449 | 12/1934 | Heggem | 251—163 |
| 2,501,635 | 3/1950 | Schmidt | 251—163 |
| 2,612,338 | 9/1952 | Flosdorf | 251—158 |
| 3,033,513 | 5/1962 | Vulliez | 251—163 |

FOREIGN PATENTS

| | | |
|---|---|---|
| 399,092 | 7/1924 | Germany. |
| 406,891 | 12/1924 | Germany. |
| 922,824 | 4/1963 | Great Britain. |

CLARENCE R. GORDON, *Primary Examiner.*